United States Patent
Cudzilo et al.

(10) Patent No.: US 11,524,464 B2
(45) Date of Patent: Dec. 13, 2022

(54) METHOD AND APPARATUS FOR SUPPORT REMOVAL USING DIRECTED ATOMIZED AND SEMI-ATOMIZED FLUID

(71) Applicant: PostProcess Technologies, Inc., Buffalo, NY (US)

(72) Inventors: Nicholas Cudzilo, Lancaster, NY (US); Jon Strible, Amherst, NY (US); Daniel J. Hutchinson, Orchard Park, NY (US); Marc Farfaglia, Buffalo, NY (US)

(73) Assignee: PostProcess Technologies, Inc., Buffalo, NY (US)

( * ) Notice: Subject to any disclaimer, the term of this patent is extended or adjusted under 35 U.S.C. 154(b) by 0 days.

(21) Appl. No.: 17/038,611

(22) Filed: Sep. 30, 2020

(65) Prior Publication Data
US 2021/0008808 A1 Jan. 14, 2021

Related U.S. Application Data

(63) Continuation-in-part of application No. 16/232,955, filed on Dec. 26, 2018, now Pat. No. 10,850,449.
(Continued)

(51) Int. Cl.
*B29C 64/40* (2017.01)
*B24C 1/08* (2006.01)
(Continued)

(52) U.S. Cl.
CPC ............... *B29C 64/40* (2017.08); *B24C 1/08* (2013.01); *B29C 64/30* (2017.08); *B29C 64/35* (2017.08); *B33Y 40/20* (2020.01)

(58) Field of Classification Search
CPC ......... B29C 64/40; B29C 64/30; B29C 64/35; B22F 10/66; B22F 10/40; B22F 10/62; B22F 10/00; B22F 3/24
See application file for complete search history.

(56) References Cited

U.S. PATENT DOCUMENTS 3,343,304 A 9/1967 Eppler
3,807,054 A 4/1974 Joseph et al.
(Continued)

FOREIGN PATENT DOCUMENTS

WO 2014/177823 A1 11/2014
WO 2019/113104 A1 6/2019
WO 2020/006141 A1 1/2020

OTHER PUBLICATIONS

Schlyer Machinery Co., "Model CBW 1026 LH cage and bottle washer", Rev. 07-05, Feb. 28, 2005, 1 page.
(Continued)

*Primary Examiner* — Nahida Sultana
(74) *Attorney, Agent, or Firm* — Hodgson Russ LLP

(57) ABSTRACT

An apparatus and method for removing support material from and/or smoothing surfaces of an additively manufactured part (the "AM part") is disclosed. The apparatus may include a chamber, a support surface within the chamber, and one or more nozzles within the chamber. The nozzles may be the same size or different sizes. The support surface may be configured to support the AM part. The support surface may have one or more openings sized and configured to allow the fluid to pass through the opening(s). The nozzles may be configured to spray a fluid at the AM part, and the spray may be an atomized or semi-atomized spray of the fluid. For removing support material from parts with internal spaces, such as cavities or passages, the apparatus can include a nozzle at the end of an adjustable flexible hose member that can be adjusted to spray into an internal space of the part. Alternatively, for removing unwanted support material from multiple parts with internal spaces, the apparatus may include a submersion tank.

3 Claims, 13 Drawing Sheets

Related U.S. Application Data

(60) Provisional application No. 62/908,335, filed on Sep. 30, 2019, provisional application No. 62/612,483, filed on Dec. 31, 2017.

(51) Int. Cl.
   *B33Y 40/20* (2020.01)
   *B29C 64/30* (2017.01)
   *B29C 64/35* (2017.01)

(56) References Cited

U.S. PATENT DOCUMENTS

| | | | |
|---|---|---|---|
| 4,818,292 | A | 4/1989 | Iley et al. |
| 5,335,682 | A | 8/1994 | Yoshimura et al. |
| 5,487,695 | A | 1/1996 | Shank |
| 5,556,324 | A | 9/1996 | Shank, Jr. |
| 5,575,705 | A | 11/1996 | Yam et al. |
| 6,109,277 | A | 8/2000 | Linton et al. |
| 6,253,462 | B1 | 7/2001 | Schwarz |
| 9,592,539 | B2 | 3/2017 | Dunn et al. |
| 9,855,589 | B2 | 1/2018 | Dunn et al. |
| 10,112,344 | B2 | 10/2018 | McMahon et al. |
| 2002/0002987 | A1 | 1/2002 | Jones et al. |
| 2002/0170580 | A1 | 11/2002 | Clifford et al. |
| 2008/0041423 | A1 | 2/2008 | Hardikar et al. |
| 2009/0241997 | A1 | 10/2009 | Tafoya |
| 2009/0321972 | A1 | 12/2009 | Zinniel |
| 2011/0186081 | A1 | 8/2011 | Dunn et al. |
| 2012/0125365 | A1 | 5/2012 | Ike et al. |
| 2012/0238186 | A1 | 9/2012 | Asai et al. |
| 2012/0273009 | A1 | 11/2012 | Eriksson et al. |
| 2013/0248491 | A1 | 9/2013 | McMahon et al. |
| 2018/0215106 | A1 | 8/2018 | McMahon et al. |
| 2019/0184432 | A1* | 6/2019 | Dore .................. B08B 3/14 |
| 2020/0324479 | A1* | 10/2020 | Friedrich ............. A61C 5/77 |

OTHER PUBLICATIONS

Schlyer Machinery Co., "Model CBW 1026 RH cage and bottle washer", Rev. 07-05, Feb. 28, 2005, 1 page.

Schlyer Machinery Co., "Model CBW 1026C cage and bottle washer", Part No. CBW 1026C L, Rev. 07-0, Feb. 28, 2005, 1 page.

Schlyer Machinery Co., "Model CBW 1026C cage and bottle washer", Part No. CBW 1026C R, Rev. 07-05, Feb. 28, 2005, 1 page.

Schlyer Machinery Co., "Model CBW 1026L LH cage and bottle washer", REV. 07-05, Feb. 28, 2005, 1 page.

Schlyer Machinery Co., "Model CBW 1026LLS LH cage and bottle washer", REV. 07-05, Feb. 28, 2005, 1 page.

Schlyer Machinery Co., "Model CBW 1026LLS RH cage and bottle washer", REV. 07-05, Feb. 28, 2005, 1 page.

Schlyer Machinery Co., "Model CBW 1026LS RH cage and bottle washer", REV. 07-05, Feb. 28, 2005, 1 page.

Schlyer Machinery Co., "Model CBW 1026LS LH cage and bottle washer", REV. 07-05, Feb. 28, 2005, 1 page.

Schlyer Machinery Co., "Model BW 1020 bottle washer", Apr. 24, 2012, 1 page.

Schlyer Machinery Co., "Model BW 1020 general specifications," 6 pages.

Schlyer Machinery Co., "Model CBW 1026 Cage and bottle washer general specifications," 11 pages.

* cited by examiner

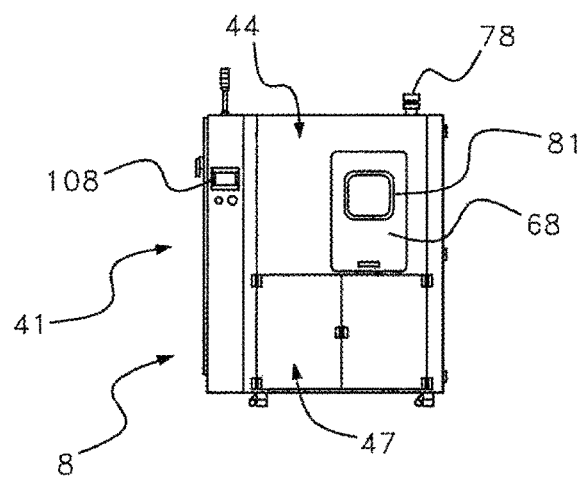
Fig. 3A
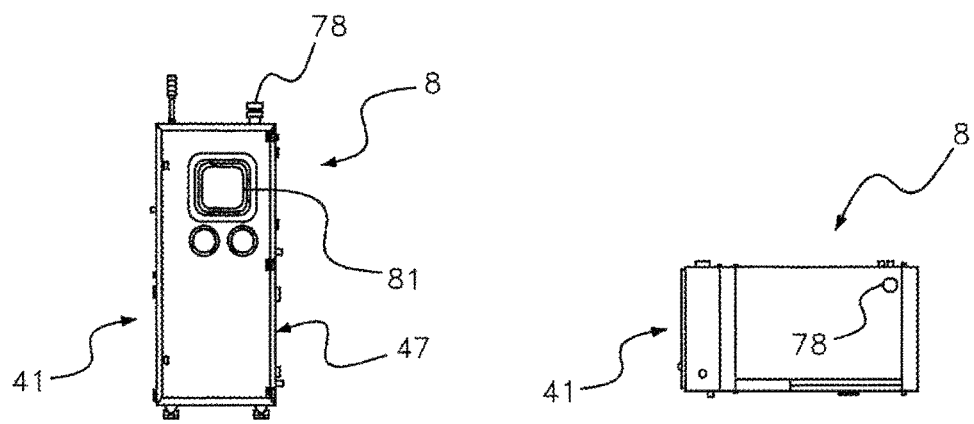
Fig. 3B
Fig. 3C

US 11,524,464 B2

METHOD AND APPARATUS FOR SUPPORT REMOVAL USING DIRECTED ATOMIZED AND SEMI-ATOMIZED FLUID

CROSS-REFERENCE TO RELATED APPLICATIONS

This application claims priority to U.S. provisional patent application 62/908,335 (filed on Sep. 30, 2019), and is a continuation-in-part of U.S. patent application Ser. No. 16/232,955 (filed on Dec. 26, 2018), which claims priority to U.S. provisional patent application 62/612,483 (filed Dec. 31, 2017).

FIELD OF THE INVENTION

This invention relates generally to a method and apparatus for removing support material from parts that have been made via additive manufacturing techniques, such as 3D printing.

BACKGROUND OF THE INVENTION

Additive manufacturing processes, such as 3D printing (e.g. Selective Laser Sintering (SLS), Stereolithography (SLA), fused deposition modeling (FDM), material jetting (MJ), electron beam (e-beam), etc.) have enabled the production of parts having complex geometries that would never be possible through traditional manufacturing techniques, such as casting, injection molding, or forging. However, additive manufacturing produces parts that require significant efforts to remove unwanted support material. The support material is needed during the manufacturing process to support portions of the part as the part is being manufactured in order to achieve complex geometries. After the manufacturing process is completed, the unwanted support material must be removed and/or rough surfaces may need to be smoothed.

The support material itself can have a complex geometry and can also be extensive. Additionally, since additive manufacturing manufactures a part in discrete layers, the surface of a part is often rough, because adjacent layers may not end in similar locations thereby leaving a rough bumpy outer surface. Such a rough outer surface is unappealing from a visual standpoint, and the uneven surface can create stress concentrations, which could develop during testing or use of the part and lead to pre-mature failure.

A current option in the additive manufacturing industry is to manually remove the support material and manually finish the surface of a part in order to produce a smooth exterior surface of the part. Depending on the type of part, using manual labor could be cost prohibitive, and could lead to excessive removal of material, an uneven surface, or both. If a surface is finished unevenly or incompletely, stress concentrations could still be unintentionally prevalent, leading to pre-mature failure of the part. In addition, manual removal of unwanted support material and manual surface finishing lacks consistency over an extended period of time and from part to part. And, such manual removal/finishing may create a bottleneck in the production process since, for example, one technician can remove support material from only a single part at a time.

Another option the additive manufacturing industry is moving toward is to use a machine, such as those providing a chemical bath, to remove support material and/or to perform surface finishing. However, such machines are limited in the type of process parameters that can be altered to tailor the process to a specific part, and also such machines require the attention of, and operation by, a technician while the machine is running, which does not completely eliminate the bottleneck issue described above. Additionally, if a technician is unaware that a machine is not set at the proper parameters, excessive material removal could occur, ruining the part.

Thus, there is a need for a method and apparatus for automatically removing support material from and smoothing the surface of parts made via additive manufacturing techniques without damaging the part itself. One such approach is to use embodiments of the present invention, which use atomized and semi-atomized fluid, chemical dissolution, and pressurized fluid. Additionally, embodiments of the present invention may provide an alternative that seeks to remove the manual labor bottleneck of processing additive manufactured parts in order to achieve surface finishing and/or support removal ("SF/SR").

SUMMARY OF THE INVENTION

The invention may be embodied as an apparatus for removing support material from and/or smoothing surfaces of an additively manufactured part (the "AM part"). The apparatus may include a chamber, a support surface within the chamber, and one or more nozzles within the chamber. The nozzles may be the same size or different sizes.

The support surface may be configured to support the AM part. The support surface may have one or more openings sized and configured to allow the fluid to pass through the opening(s). For example, the support surface may be a screen-like surface.

The nozzles may be configured to spray a fluid at the AM part, and the spray may be an atomized or semi-atomized spray of the fluid. The nozzles may be arranged in groups, each group being part of a spray header that is fed from a common supply tube. The nozzles of a particular spray-header may be the same size, but they need not be the same size. For example, the nozzles of a particular spray-header may be selected from two or more sizes.

The nozzles of one spray-header may be the same size as the nozzles of another spray-header, but the nozzles of one spray-header may be differently sized from the nozzles of another spray-header. For example, with regard to two spray-headers the nozzles of one spray-header may be selected to be of a first size, and the nozzles of the other spray-header may be selected to be of a second size.

In one embodiment of the invention, there are two spray-headers of nozzles; one above the support surface (a.k.a. "top spray-header) and one below the support surface (a.k.a. "bottom spray-header"). The top spray-header may point the nozzles to spray downward toward the AM part, and the bottom spray-header may point the nozzles to spray upward toward the AM part.

One or more valves may be included in the apparatus so that fluid can flow and spray through a first set of nozzles having one size at the same time that fluid cannot flow to spray through second nozzles of a second size. For example, nozzles of a particular spray-header may be of two or more sizes, and fluid can be made to flow through and to spray from first nozzles of one size at the same time that fluid cannot flow to spray through second nozzles of another size.

One or more of the spray-headers of nozzles may be secured to a mount that is adjustable to move the spray-header(s) nearer to or further away from the support surface. One or more of the spray-headers of nozzles may be connected directly or indirectly to an actuator for translating the spray-header(s) back and forth in a planar motion.

The apparatus may also include a tank configured to hold a volume of the fluid, and the tank may be positioned (e.g. in the chamber) to capture the fluid after the fluid is sprayed.

The apparatus may also include a heater for heating the fluid to a desired temperature. The heater may be at least partially within the tank.

The apparatus may include a ventilation system. The ventilation system may be a blower for forcing air into or pulling air out of the chamber. The ventilation system may be a vent for allowing air to leave or enter the chamber. The ventilation system may include both such a blower and such a vent.

The invention may be embodied as a method of removing support material from and/or smoothing surfaces of an AM part. Such a method may include providing a chamber, a support surface within the chamber, and one or more nozzles within the chamber. An AM part may be placed on the support surface, and a fluid may be sprayed at the AM part. The nozzles may generate an atomized or semi-atomized spray of the fluid.

The nozzles may spray at the same velocity. However, in at least one embodiment of a method according to the invention at least one of the nozzles sprays the fluid at a velocity that is different from the spray velocity created by a different one of the nozzles.

The method may be carried out so that one (or more) of the nozzles sprays the fluid at a first flow rate and one (or more) of the nozzles sprays the fluid at a second flow rate. For example, in one embodiment of a method that is in keeping with the invention a first one (or more) of nozzles sprays the fluid at a first flow rate and a second one (or more) of the nozzles sprays the fluid at a second flow rate.

The method may be carried out in such a manner that a one (or more) of the nozzles has a first size and one or more of the nozzles has a second size, and a pressure at which the fluid is supplied to the nozzles of the first size is different than a pressure at which the fluid is supplied to the nozzles of the second size.

A tank may be provided. The tank may be configured to hold a volume of the fluid, and to capture the fluid in the tank after the fluid is sprayed. Such a tank may be well suited to facilitating a cycling of the fluid through the nozzles so that the same fluid may be sprayed many times at the AM part.

A heater may be provided, and may be arranged in the tank. The heater may be used to heat the fluid to a desired temperature. The temperature of the fluid may be increased toward the desired temperature while the AM part is sprayed.

Spraying of the fluid may occur from a first set of the nozzles that is configured to spray the fluid substantially downward toward the AM part, and also from a second set of the nozzles that is configured to spray the fluid substantially upward toward the AM part.

While spraying occurs, the nozzles may be translated. For example, one or more sets of the nozzles may be translated during spraying of the fluid.

Air may be blown into or pulled out of the chamber. This may be done during spraying and/or after spraying.

For removing support material from parts with internal spaces, such as cavities or passages, the apparatus can include a nozzle at the end of an adjustable flexible hose member that can be adjusted to spray into an internal space of a part. Alternatively, for removing unwanted support material from multiple parts with internal spaces, the apparatus may include a submersion tank.

BRIEF DESCRIPTION OF THE DRAWINGS

For a fuller understanding of the nature and objects of the invention, reference should be made to the accompanying drawings and the subsequent description. Briefly:

FIG. 3A is a front view of an apparatus that is in keeping with the invention;

FIG. 3B is a side view of the apparatus depicted in FIG. 3A;

FIG. 3C is a top view of the apparatus depicted in FIG. 3A;

DETAILED DESCRIPTION OF THE INVENTION

At the outset, it should be appreciated that like drawing numbers on different drawing views identify identical, or functionally similar, structural elements of the invention.

Furthermore, it is understood that this invention is not limited to the particular methodology, materials, or modifications described and, as such, the invention may vary from that which is disclosed herein. It is also understood that the terminology used herein is for the purpose of describing particular aspects, and this invention is not limited to the disclosed aspects.

Unless defined otherwise, all technical and scientific terms used herein have the same meaning as commonly understood to one of ordinary skill in the art to which this invention pertains. It should be understood that methods, devices or materials similar or equivalent to those described herein can be used in the practice or testing of the method and apparatus.

Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Figure 1:
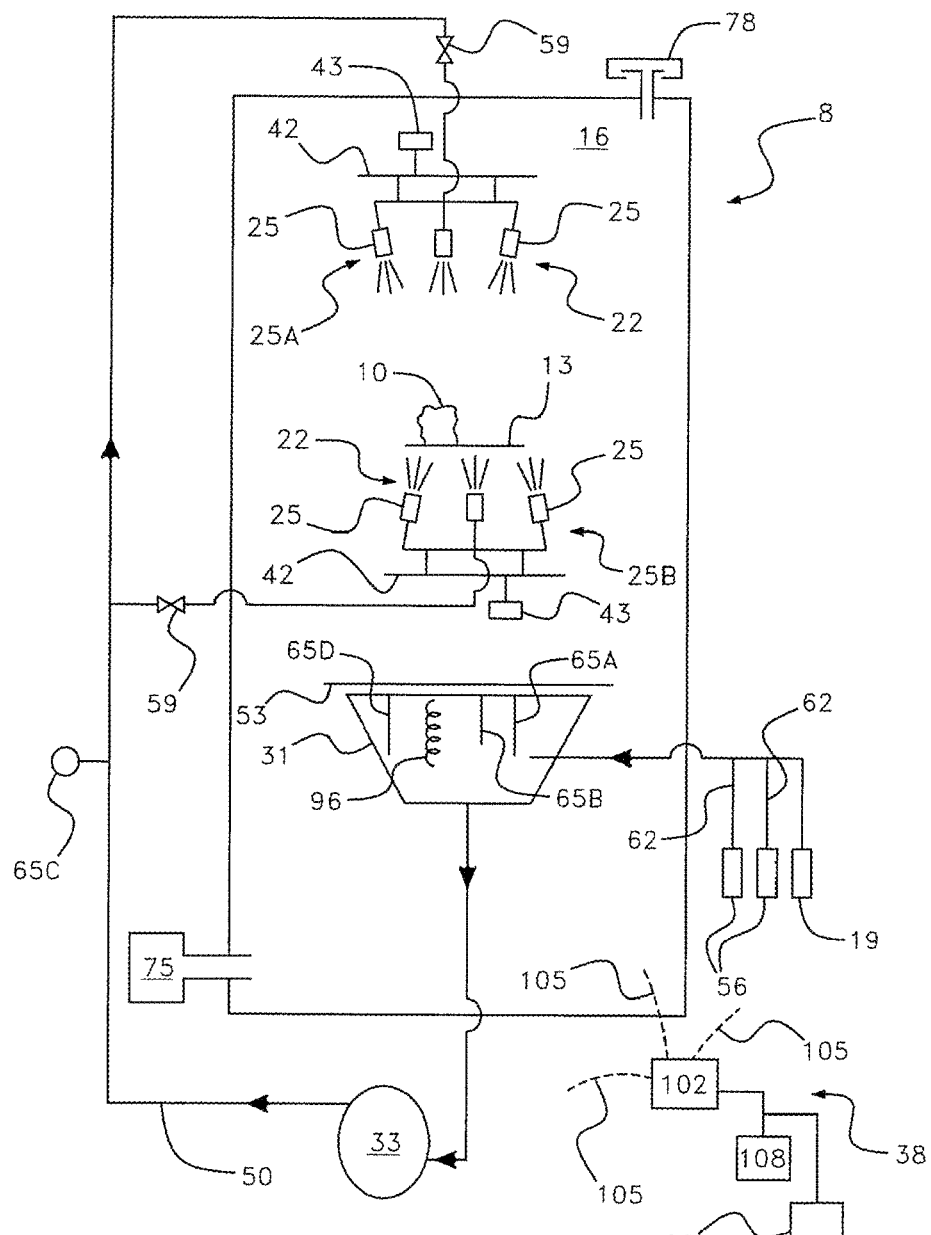
FIG. 1 is a schematic depiction of an apparatus that is in keeping with the invention.
Figure 2:
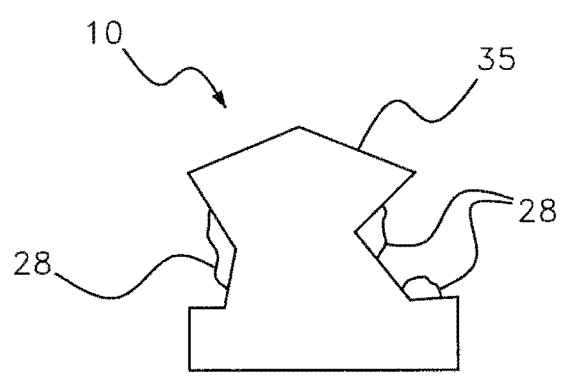
FIG. 2 is a schematic depiction of an additively manufactured part.

Adverting now to the figures, with specific reference in FIGS. 1-2, the present invention may be embodied as a method or an apparatus 8 for SF/SR. In such a method or apparatus 8, one or more additive manufactured parts 10 needing SF/SR are placed on a platform or tray 13 in a chamber 16 of an apparatus 8 for carrying out SF/SR. An SF/SR fluid 22 for dissolving and/or eroding the support material 28 may be sprayed at the part(s) 10 through nozzles 25 situated underneath the part(s) 10 or above the part(s) 10 or both. The nozzles 25 below the part(s) 10 and the nozzles 25 above the part(s) 10 may be referred herein as bottom nozzles 25B and top nozzles 25A, respectively. The fluid 22 may be supplied from a tank 31, open at its upper side. The tank 31 may be situated below the bottom nozzles 25. A pump 33 may be used to draw fluid 22 from the tank 31 and then force the fluid 22 through a series of pipes 50 connected to the nozzles 25, which causes the fluid 22 to spray out of the nozzles 25 at the part(s) 10. Each nozzle 25 may comprise a pipe or tube section having multiple apertures or nozzles through which the fluid 22 sprays, and these arrangements are sometimes referenced herein, as a "spray-header". The fluid 22 then collects back into the tank 31 where the fluid 22 is recycled back through the apparatus, i.e., drawn from the tank 31, forced to the nozzles 25, sprayed at the parts 10, and collected in the tank 31. In this mode of operation the apparatus 8 may be a closed-loop system.

Additive manufactured parts 10 may be made using numerous different methods, classes of materials (e.g., plastics, metals), specific build materials (e.g., nylon within the plastics class, aluminum within the metals class) and support materials. Each method, class of material, and specific build material can have its own unique qualities and characteristics and thus may require different parameters for effective and efficient removal of support material 28. Additionally, for a given type, parts 10 made by such an additive manufacturing process and/or materials may have very different geometries, including designs having more delicate features than others, which thus may require adjustments for effective and efficient removal of support material 28. As explained in more detail herein, the amount of fluid 22 sprayed, the direction of spray (from top and/or bottom), the location of spray (e.g., left versus right side of part or top versus bottom side of part), the pressure at which fluid 22 is pumped to the nozzles 25, and the degree of atomization, as well as other parameters such as the make-up, temperature and pH of the fluid, can be adjusted to create different combinations or "recipes" of these parameters in order to efficiently and effectively remove a given type of support material 28 for a given type of build material 35 and geometric design of additive manufactured part(s) 10. In some embodiments of the present invention, an operator can set or change these parameters using a human-machine interface ("HMI") 38, such as a touch screen 108 connected to a general-purpose computer having a central processing unit ("CPU") 102. The general-purpose computer may have wired or wireless communications links 105 for sending and receiving communications signals to/from components of the apparatus 8.

The fluid 22 is capable of dissolving and/or degrading support material 28, and may be aqueous-based chemical formulations made with a single chemical or a variety of chemicals. The fluid 22 may, in some embodiments, be referred to as a detergent. Preferably, the fluid 22, either naturally or aided by the parameter settings, degrades or dissolves support material 28 and the rough surface of the part 10 without also degrading, dissolving or causing damage to the build material 35 of the part 10 that is intended to be preserved. Such fluids 22 can include but are not limited to those fluids that are optimized for SF/SR for parts 10 made by MJ, SLA and FDM, respectively. The fluid 22 can also include an anti-foaming agent to help minimize foaming of the fluid during the SF/SR process.

An embodiment of the present invention may be an apparatus 8 having a housing 41 comprising a first section 44, a second section 47 arranged adjacent to said first section 44, as illustrated in FIGS. 1, 3A, 3B, and 3C. The first section 44 may include a chamber 16 where the SF/SR of an additive manufactured part 10 occurs. The second section 47 may house many of the plumbing components for the apparatus 8, such as a pump 33, valves 59, and hoses 62. The second section 47 can be arranged either below or to the side of the first section 44.

The first section 44 may include a door 68 for an operator to access the chamber, and place parts 10 into and remove them from the chamber 16. The door 68 can be a counter-weighted balanced door to allow for easy access. As discussed further below, the chamber 16 may heat up during the apparatus' operation. The chamber 16 can include a ventilation or exhaust system to provide a heated equalized chamber 16 to aid both in the removal of support material 28 as well as enhancing the evaporation of residual fluid 22 off of the part 10 upon completion of the SF/SR process. A ventilation system may be of any type suitable for venting heat and vapors that can build up in the chamber 16. As one example, the ventilation system may comprise one or more blowers 75 pulling air from the chamber 16, such as blowers rated, for example, at 0.5 to 1000 cubic feet per minute (CFM). In this approach the ventilation system may create a negative pressure in the chamber 16 so that when the door 68 is opened, air is pulled inward through the door 68. In another example, the ventilation system may comprise one or more fans or blowers 75 pushing air into the chamber 16, combined with a chimney or other exhaust mechanism 78 in the roof of the chamber 16. The fan or blower 75 may create a positive pressure in the chamber 16 and the chimney 78 allows excess heat and vapors to escape. Additionally, windows 81 may be placed in the sides of the chamber 16 to allow for in-process monitoring by humans and sensors of the SF/SR process.

A tray or platform 13 on which the parts 10 can be set while an SF/SR process occurs may be situated in the chamber 16. A first plurality of nozzles 25 (such as the top nozzles 25A) may be arranged in the chamber 16, allowing for fluid 22 to be sprayed downward toward the parts 10 situated on the tray 13. A second plurality of nozzles 25 (such as the bottom nozzles 25B) may be arranged in the chamber 16, directly below the tray 13, allowing for fluid 22 to be sprayed upward toward the parts 10 situated on the tray 13. The bottom nozzles 25B and top nozzles 25A are thus arranged opposite from each other, spraying in directions toward each other, with the parts 10 situated therebetween. The first section 44 also may include a tank 31 for holding the fluid 22. The tank 31 may be situated below the bottom nozzles 25B.

The tray 13 may have openings of suitable size, quantity and distribution, such as a mesh screen, so that the tray 13 can support the parts 10, yet allow fluid 22 to be sprayed at the parts 10 from the bottom nozzles 25B, allow fluid 22 sprayed from both the bottom and top nozzles 25B, 25A to flow down into the tank 31, and help to prevent support material 28 that detaches from the part 10 from falling down into the tank 31. A mesh screen 53 may be arranged between the tank 31 and the bottom nozzles 25B to further prevent pieces of detached support material 28 from entering the tank 31.

In one embodiment of the invention, a first plurality of nozzles 25 comprises a single spray-header of nozzles 25, and in another embodiment of the invention the first plurality of nozzles 25 comprises more than a single spray-header of nozzles 25, such as three spray-headers of top nozzles 25A. The size of the apertures or nozzles in one spray-header of nozzles 25 can be different from the size of the apertures or nozzles in another spray-header, thereby resulting in different fluid velocities spraying from the two different sets of nozzles 25, with one velocity being higher than the other. For example, in the embodiment with three sets of top nozzle spray-headers 25A, the first and third sets can each comprise five apertures/nozzles of the same or similar size (or degree of spray angle), while the second set can comprise three apertures/nozzles of a larger size (or degree of spray angle). The top nozzles 25A can be either mounted to the housing 41 itself, or mounted on a movable track 42 connected to an actuator 43 that allows the nozzles 25 to oscillate in the horizontal direction. The second plurality of nozzles 25 can be identical to the first plurality of nozzles 25 mounted on a movable track 42 that is connected to an actuator 43, or can be stationary nozzles 25 that cannot move independently on a track. In one embodiment, the second plurality of nozzles 25 comprises a spray-header having thirteen nozzles 25 each of the same or similar size (or degree of spray angle).

In another embodiment of the invention, nozzles 25 could be arranged to surround the chamber 16 so that the nozzles 25 are on all six sides surrounding the part 10 in the chamber 16. Each nozzle 25 can be independently controlled by a separate motor or be connected as a nozzle assembly. In this embodiment there are nozzles 25 mounted both horizontally and vertically.

Figure 4:
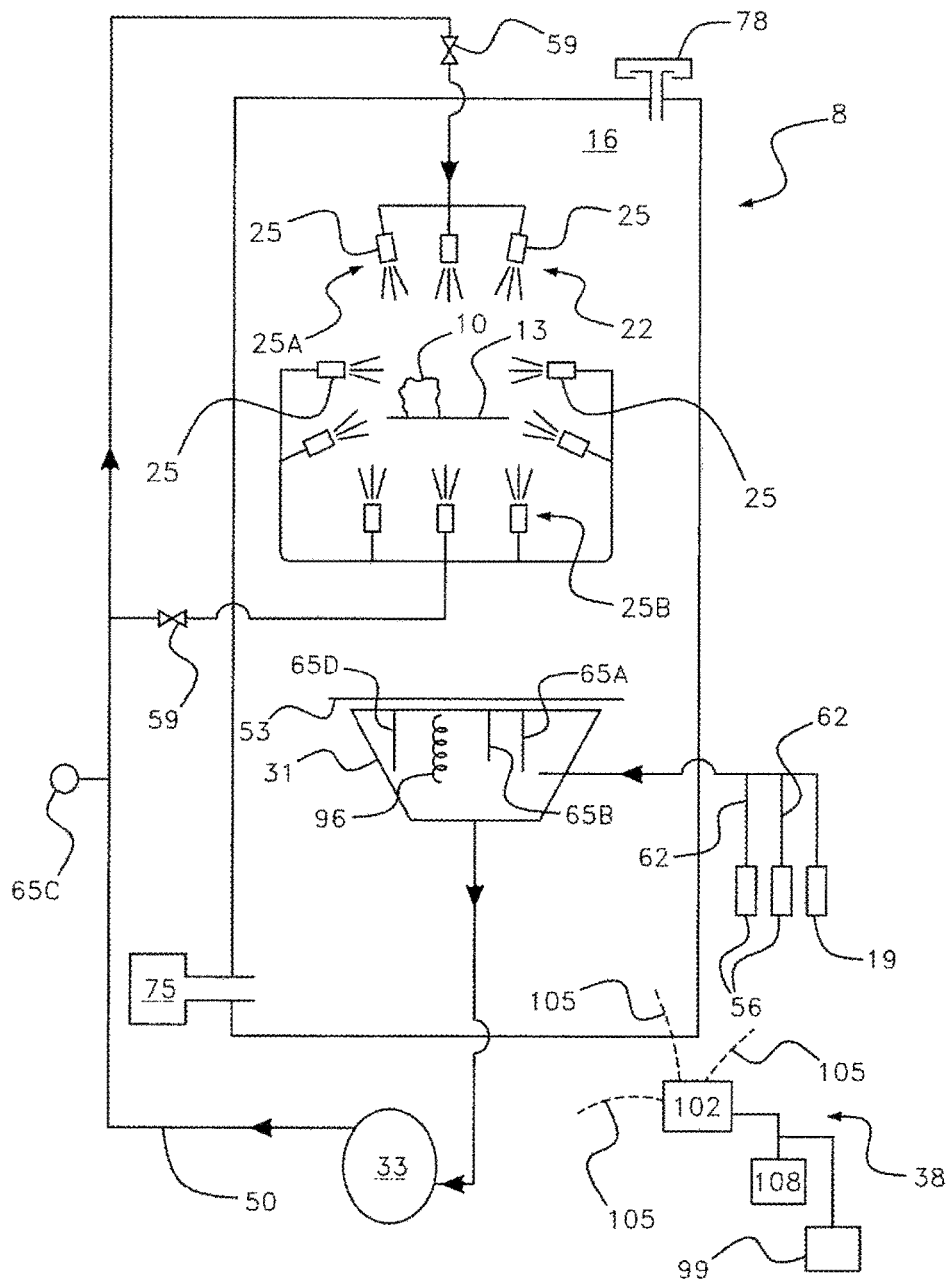
FIG. 4 is a schematic depiction of an apparatus that is in keeping with the invention.

FIG. 4 depicts a further embodiment of the invention in which the bottom nozzles 25B are arranged as a U-shaped spray-header. As with the embodiment mentioned directly above, the nozzles 25 may spray the AM part 25 from different directions and thereby spray additional sides of the AM part 25 more directly. In a similar manner, the top spray-header of nozzles 25A may be U-shaped. Or, both the top spray-header of nozzles 25A and the bottom spray-header of nozzles 25B may be U-shaped.

Servomotors or other actuators may be used to oscillate a spray-header of nozzles 25 through a range of distance about a center point. Interface and control buttons may enable an operator to adjust the location of the center point (by causing the spray-header of nozzles 25 to move forward or backward) and/or the speed at which the nozzles 25 oscillate. For example, the center point could be set anywhere between a range of 0-275 millimeters and the speed could be set anywhere between a range of 0-50 mm/sec. Or, these parameters may be pre-stored in connection with an operating recipe that the operator has the option to select. In one embodiment of the invention the operator can also adjust the distance that the nozzles 25 oscillate. The movement of each nozzle 25 may be tracked by a position sensor. The first plurality of nozzles 25 could be made to oscillate only if at least one of the valves 59 to a nozzle contained in the first plurality of nozzle 25 is open. In such an embodiment, if only the second plurality of nozzles 25 is activated, then the first plurality of nozzles 25 does not oscillate.

The nozzles 25 can be individual nozzles 25, or can be tubes/piping having a plurality of apertures therein, e.g. a manifold (each such aperture is also referred to as a "nozzle"), or could include nozzles 25 secured to the tubes/piping. Additionally, the individual nozzles 25, including individual nozzles secured to the tubes/piping, may be constructed to rotate independently, using motors, in order to spray parts 10 within the chamber 16 at a variety of angles. Each nozzle 25 may be independently controlled by a separate motor or be connected to each other so as to form a nozzle assembly. Additionally, each nozzle 25 could be controlled by a multi-axis robot. The nozzles 25 may be made to move in horizontal and/or vertical directions. It should be appreciated that each nozzle 25 may be connected to its own pump and plumbing system.

Both the first and second plurality of nozzles 25 (e.g., top and bottom nozzles 25A, 25B) may be connected to a pump 33, which may be located within the second section 47 of the housing 41. After drawing fluid 22 from the tank 31, the pump 33 can force the fluid 22 through pipes 50 (which may be a flexible hose) to the nozzles 25. A manifold may be used to separate the fluid 22 output from the pump 33 into separate supplies for each spray-header of nozzles 25. The individual pipe 50 to each spray-header of nozzles 25 may include a valve 59 to control the flow of fluid 22 to the nozzles 25. This arrangement allows nozzles 25 to be used selectively (on/off), thereby increasing efficiency where all of the nozzles 25 are not required for SF/SR and/or where it is preferred to have some nozzles 25 at higher or lower pressures than others.

For example, an embodiment of the invention may have one bottom spray-header of nozzles 25 and three top spray-headers of nozzles 25, where at least one of the top spray-headers has narrow-angle nozzles 25 (producing comparatively higher velocity spray) and at least one of the other top spray-headers has wide-angle nozzles 25 (producing comparatively lower velocity spray). In each of the following examples, the valve 59 controlling flow to the bottom spray-header of nozzles 25 may always be open. In one mode of operation, all of the valves 59 controlling flow to the top nozzles 25 can be closed so that fluid 22 sprays only from the bottom spray-header 25B. This mode can produce the lowest degree of agitation of the additively manufactured parts 10 being SF/SR processed in the chamber 16, and may be referred to as "ultra-low agitation." In another mode of operation the valve(s) 59 controlling flow to the top spray-header(s) 25A having wide-angle nozzles 25 may be open, but the valve(s) 59 controlling flow to the top spray-header(s) 25A having narrow-angle nozzles 25 may be closed. This mode can produce a higher degree of agitation than where only the bottom nozzles 25B are used, and may be referred to as "low agitation." In yet another mode of operation, the valve(s) 59 controlling flow to the top spray-header(s) 25A having wide-angle nozzles 25 may be open and the valve 59 controlling flow to one (but not more than one) top spray-header having narrow-angle nozzles 25 may be open. This mode can produce a higher degree of agitation than the prior example, and may be referred to as "medium agitation." In yet a further mode of operation, the valve(s) 59 controlling flow to the top spray-header(s) 25A having narrow-angle nozzles 25 may be open but the valve(s) 59 controlling flow to the top spray-header(s) 25 have wide-angle nozzles 25 may be closed. This mode can produce the highest level of agitation, and may be referred to as "high agitation." Other arrangements of spray-headers, varying sizes of nozzles 25, and open versus closed valves 59 may be used to create additional variations in the levels of agitation. Thus, the use of terms such as "low," "medium" and "high" are not meant to be limited to the precise arrangements described in the foregoing examples, but rather to exemplify that various, relative degrees of agitation can be accomplished as desired to meet specific needs.

An operator can use the HMI 38 to select a desired level of agitation, or the agitation level may be pre-stored in connection with a given operating recipe that the operator has the option to select. By setting the agitation level, the apparatus 8 automatically opens and closes the valves 59 to the nozzles 25 as appropriate to achieve that selected level of agitation. These parameters can be set individually or by selecting a pre-stored recipe.

The pressure of the fluid 22 pumped through the system may be a function of a variety of factors including the action of the pump 33, the length, sizing and configuration of the plumbing between the pump 33 and the nozzles 25, and the sizes and quantity of nozzles 25. The apparatus 8 may have one or more sensors 65C located at or near the inlet to each valve 59 leading to each spray-header of nozzles 25, or at another suitable location, for measuring and monitoring the pressure of the fluid 22 being forced to the nozzles 25. This pressure can be, for example, from 0.01 psi to 100 psi. During operation, the pressure can change for a variety of reasons, and the apparatus 8 may include sensors 65C for measuring the pressure. The apparatus may alert the operator if the pressure begins to decrease or increase from the level expected, or initially achieved, for a given set of SF/SR processing parameters, and also may alert the operator if the pressure drops below or exceeds minimum and maximum levels, respectively. These minimum and maximum levels can be pre-programmed into the apparatus 8. Additionally, if these minimum or maximum pressure levels are exceeded, the apparatus 8 can to automatically shut down.

An embodiment of the invention may simultaneously achieve a high rate of fluid flow through the nozzles 25, such as 5 to 150 gallons per minute, and a low pressure at which the fluid 22 is provided to the nozzles 25, such as 15-30 psi. The speed at which support material is removed may be aided by having as much flow of fluid 22 on the part 10 as possible, while protecting the build material 35 of the part 10 from erosion by maintaining the fluid velocity below a desired level. The nozzle aperture sizes (and/or spray angles), quantities of nozzles 25 and specifications for the pump 33 and plumbing may be selected to achieve these multiple goals. Additionally, oscillating the nozzles 25 changes the direction and speed of the spray exiting the nozzles 25, which provides an additional opportunity for modulating both the force of the fluid 22 impacting the parts 10 as well as the area covered by that fluid 22. For example, oscillating the nozzles 25 at a higher speed may result in a lower average force at which the fluid 22 impacts the additive manufactured parts 10 and a wider coverage area within the chamber 16.

Figure 5:
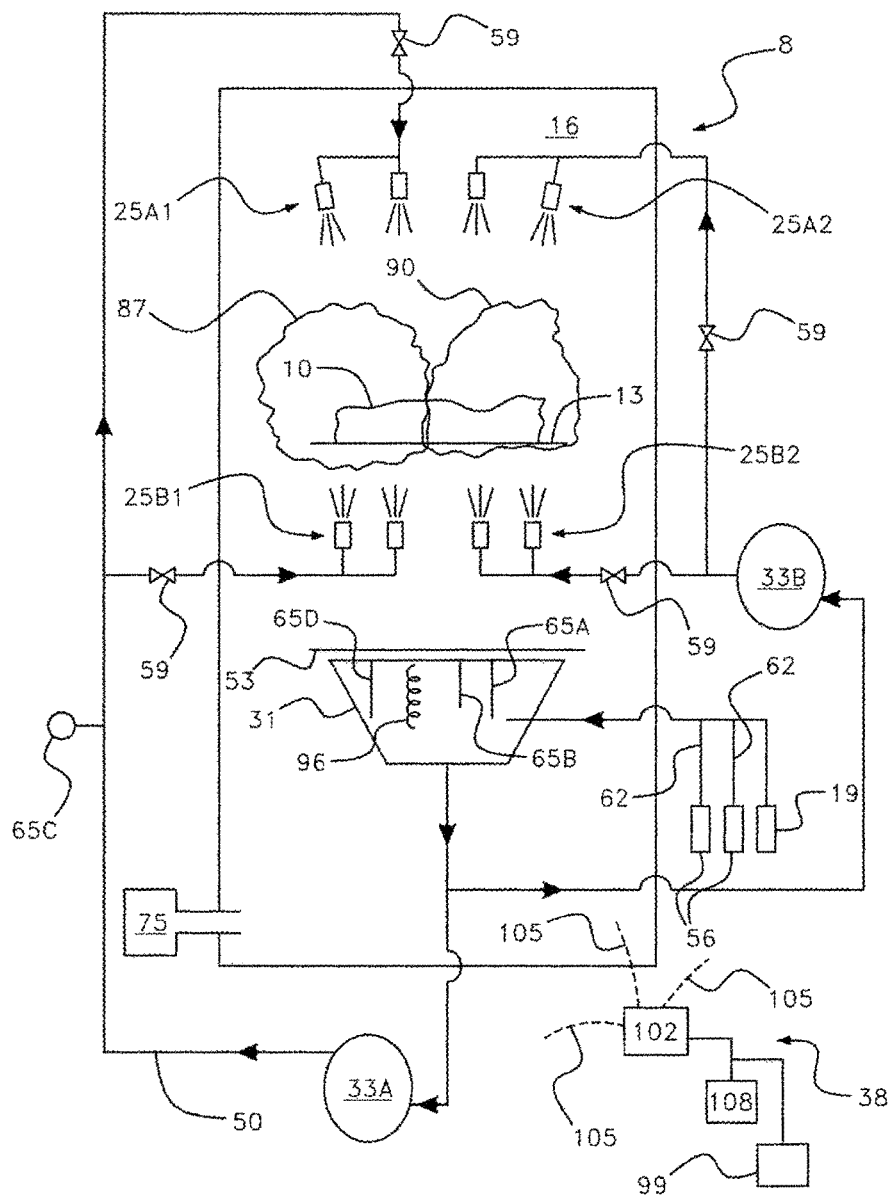
FIG. 5 is a schematic depiction of an apparatus that is in keeping with the invention.

In another embodiment of the invention as illustrated in FIG. 5, a wider chamber 16 is used and there are two systems of top and bottom nozzles 25, arranged adjacent to each other, effectively defining first processing region 87 and second processing region 90 within the chamber 16. In this embodiment, fluid 22 is delivered to the first processing region 87 by the first top nozzles 25A1 and first bottom nozzles 25B1, and fluid 22 is delivered to the second processing region 90 by the second top nozzles 25A2 and second bottom nozzles 25B2. In this embodiment, the tank 31 situated below the bottom nozzles 25B can be a single tank 31 spanning the two regions 87, 90. A first pump 33A can be connected to the first top and first bottom nozzles 25A1, 25B1, and a second pump 33B can be connected to the second top and second bottom nozzles 25A2, 25B2. In this embodiment, the pumps 33, valves 59, spray-headers of nozzles 25, and all of the various settings relating thereto can be set and operated in the two regions 87, 90 independently.

This embodiment enables the apparatus 8 to have different flow rates, pressures and spray velocities (i.e., agitation levels) as between the two regions 87, 90. This can be useful in several ways. For example, some additive manufactured parts 10 are long and have more support material 28 and/or surface areas of build material 35 toward one end of the part 10 ("heavy end") versus the opposite end ("light end"). If the same flow, pressure levels and spray velocities were applied across the entire part 10, then either the light end would be at risk for over-processing (which might include degradation or warping of the part 10) or the heavy end of the part 10 would be at risk for under-processing (leaving too much support material 28 or un-smoothed surfaces of build material 35 remaining on the part 10). By having two independent SF/SR processing regions 87, 90, the part 10 can be situated in the chamber 16 so that the end with more support material 28 and/or surface areas of build material 35 lies in the region that has higher flow, pressure and spray velocity, while the other end of the part 10 with less support material 28 and/or surfaces areas of build material 35 lies in the region that has lower flow, pressure and spray velocity. This protects the second end of the part 10 from over-processing and the first end of the part 10 from under-processing. Another advantage of having two regions is that a given part 10 may have more support material near its bottom area than near its top area. A quantity of these parts 10 could be simultaneously SF/SR processed with a portion of the quantity oriented upright in one region and the other portion oriented upside down in the other region, with each region having flow of fluid 22 and pressure appropriate for those orientations of the parts.

In an embodiment where nozzles are configured to oscillate during a SF/SR process, a motion-monitoring sensor can be used to detect which of the nozzles 25 are moving during the SF/SR process. The apparatus 8 may frequently monitor the position of the nozzles 25 and if no motion is detected, the apparatus 8 may attempt to reset the motor controlling movement of the nozzles 25. If a reset of the motor is unsuccessful, then the HMI 38 may alert a user and pause the SF/SR process since the apparatus 8 may not be operating properly. The detection of nozzle movement may be done via an encoder arranged on each motor or by other suitable means.

The tank 31 may be filled automatically with fluid 22 based on parameters set by the operator or as may be pre-stored in connection with a given operating recipe that the operator has the option to select. To this end, the apparatus 8 may include devices for supplying each of water, support material solvent (also referred to as detergent), and anti-foaming agent supplies. Water may be supplied from a facility's water supply 19 or from a reservoir or other storage tank. Solvent and anti-foaming agent may be supplied each from their own reservoir or storage tank, such as a 5-gallon bucket 56 connected to the apparatus by a hose 62 or other conduit. The hose 62 for each of the solvent and anti-foaming agent may be connected to a mechanism, such as a water-powered pump, for automatically dispensing such fluids into the tank.

A liquid level sensor 65D may be situated in the tank 31 to detect the level of the fluid 22 in the tank 31, thereby enabling a determination of when the fluid 22 filling the tank 31 reaches the maximum level, at which point the sensor 65D sends a signal that is interpreted and results in the filling to automatically stop. The sensor 65D also may be employed to enable detection of when the fluid 22 drops below a desired level during operation, which can happen for example as fluids evaporate, and may send a signal that is interpreted and may result in alerting the operator to use the interface to cause more fluids to be dosed into the tank (which dosing again stops automatically if the maximum fill level is reached). Alternatively, programming could be provided to cause this dosing to occur automatically.

Use of this auto-dose feature ensures that enough fluid 22 is arranged in the apparatus 8 for the SF/SR process to run properly. When an apparatus 8 runs for an extended period of time at high temperatures, the fluid 22 used in the SF/SR process evaporates. Also, amounts of fluid 22 may adhere to interior surfaces of chamber 16 and to surfaces of components within chamber 16. In order to ensure that enough fluid 22 remains in the system, a configurable desired fluid level may be set in the software of the apparatus 8, and the fluid level in the tank 31 may be detected using a liquid level sensor 65D such as a floating sensor to detect the liquid level. If the liquid level falls below the desired level, the apparatus 8 could react by supplying additional amounts of one or more components of the fluid 22 (e.g., water, solvent, anti-foaming agent) into the tank 31. Additionally, a configurable time interval could be set by a user for checking the liquid level during the SF/SR process. At the end of a configurable time interval, the SF/SR process may pause for an amount of time (for example, 30 seconds) in order to let foam that may have formed in the tank 31 to settle. Once the settling time has elapsed, a liquid level measurement may be taken. If the liquid level has not attained the desired level, the apparatus 8 may automatically add fluid to the tank 31 and in order to fill the tank 31 up to the desired liquid level.

A heater 96, such as an immersion heater, and a sensor 65B for measuring temperature, may be situated in or in connection with the tank 31. Additionally, a pH sensor 65A may be situated in or in connection with the tank 31. The heater 96 may be used to heat the fluid 22 to a desired temperature and, based on feedback from the temperature sensor 65B, to maintain the fluid 22 at that temperature. The heater 96 may be used to heat the fluid 22 to a desired temperature within an allowable range, such as for example, 85.degree. F. to 160.degree. F., or another process-suitable range. The fluid 22 in the tank 31 may be heated to the desired temperature prior to starting the SF/SR process to spray the parts 10, or the fluid 22 can be used before it is heated at all or when it is only partially heated to the desired temperature. In this latter approach, the SF/SR process begins with the fluid 22 at a low temperature and, as time elapses during the SF/SR process, the heater 96 operates to increase the temperature of the fluid 22 to the desired level. The approach of gradually increasing the temperature of the fluid 22 can aid in the removal of support material 28. This is because the fluid 22 can usually remove support material 28 over a range of temperatures. Thus, by engaging in SF/SR as the fluid temperature rises, the fluid 22 can begin to remove support material 28 as the fluid 22 reaches the lowest temperature suitable for removing support material 28 and then remove the support material 28 more rapidly as the fluid approaches the final desired temperature. In this manner, the build material 35 of the part 10 will not heat up as much as compared to the case where the fluid 22 is at the highest temperature from the start of the SF/SR process. This helps to protect the build material 35 of the part 10 from degradation, such as warping.

The pH sensor 65A can detect the pH of the fluid 22, which at the outset can be a reflection of the combination of liquids forming the fluid 22 (e.g., solvent, water and, if used, anti-foaming agent) and may be used while filling the tank 31 to achieve the desired pH. The pH can change during the apparatus' 8 operation, for example due to dissolved support material 28 contaminating the fluid 22 or due to evaporation of portions of the fluid 22. The pH sensor 65A may be used to detect such changes and to alert the operator when the pH drops below or exceeds a desired level, whereupon the operator may use the HMI 38 to cause dosing of fluids as needed to adjust the pH to the desired level. For example, if the pH is too high (i.e., too basic), then more solvent can be added. But if the pH is too low (i.e., too acidic), then more water can be added. Alternatively, the apparatus 8 may be configured to automatically dose fluids as needed to adjust the pH. The desired temperature and pH may be set by the operator using the HMI 38, or may be pre-stored in connection with a given operating recipe that the operator has the option to select.

As the fluid 22 flows through the apparatus 8, its temperature can change, which may be undesirable. In particular, it is important to maintain the fluid 22 at the desired temperature as it travels from the tank 31 to the nozzles 25. Yet, many pumps 33 heat up while they are operating and transfer that heat to the fluid 22 as it moves through the pump 33. In embodiments of the present invention, it is preferable to use a pump 33 that adds minimal heat to the fluid 22, such as a magnetically coupled pump 33.

Atomization of the fluid 22 by spraying it through appropriately sized nozzles 25, where the fluid 22 separates into small droplets while also spreading out in a flat fan, hollow cone, or full cone spray pattern helps to control the force at which fluid 22 impacts the part 10 while maximizing flow of the fluid 22. The top nozzles 25A may be further away from the parts 10 being SF/SR processed than the bottom nozzles 25B, and in such a configuration, the force of the spray from the top nozzles 25A as it impacts the parts 10 can sometimes fall below a desired amount. The design of the bottom nozzles 25B can help with this. The spray from the bottom nozzles 25B may have enough force to hit the bottom of the parts 10 and then continue to travel upwards to heights above the parts 10. There, the droplets combine with each other and/or droplets from the top nozzles 25A into larger droplets, whereupon these larger droplets fall down onto the parts 10. Aided by both gravity and the force of the drops from the top spray nozzles 25A, these larger particles may hit the parts 10 with more flow and kinetic energy than drops coming from the top nozzles 25A alone or the bottom nozzles 25B alone. Nonetheless, the top nozzles 25A may be mounted in a way so as to be adjustable closer to or further away from the parts 10. Likewise, the location of the parts 10 may be adjustable such that parts 10 are set further away from the bottom nozzles 25B and thus closer to the top nozzles 25A, or vice-versa.

The fluid 22 in the tank 31 may be drained automatically. At the end of each SF/SR process, there may be the option to drain all the fluid 22 from the tank 31 and replace it with new fluid 22. This option may be pre-set by the operator or selected by the operator upon the completion of an SF/SR process. An auto-drain feature may also be used to drain the tank 31 after a prescribed number of SF/SR processes, which may be set by the operator.

After the tank 31 is drained, the tank 31 may be automatically filled with clean water, and used for rinsing the part 10 in order to remove fluid 22 remaining on the part 10. The water may be heated in the same manner as the fluid 22.

When selecting the parameters for the SF/SR process, the operator may set the temperature for the rinsing water or select the temperature from a pre-stored recipe. In one embodiment, the fluid 22 for removing support material 28 may be automatically drained from the tank 31 after the designated run time and replaced with clean water (using the same auto-fill mechanisms described above), which is then cycled through the apparatus 8 to rinse the parts 10, at the same agitation level setting as used during the support removal portion of the SF/SR process. During this rinsing process, the water may be pre-heated to the desired temperature or the temperature may be gradually raised while the apparatus is running.

During the SF/SR process, heat from the fluid 22 in the tank 31 can heat up air in the chamber 16. This heated air in the chamber helps, in turn, to maintain the fluid 22 at the desired temperature while fluid 22 is sprayed from the nozzles 25 and collects back into the tank 31. At the end of a SF/SR and/or rinse cycle, the heater 96 in the tank 31 may be kept operating to maintain the heat in the chamber 16, which, in turn, may be useful for drying the parts 10 prior to removing them from the chamber 16. When carried out in this manner, an SF/SR process may be said to be a "dry-to-dry" process: that is the parts 10 placed in the chamber 16 are dry and do not require preparation work to be done on them prior to the SF/SR process, and the parts 10 come out of the chamber 16 dry after the SF/SR process is complete.

Figure 6:
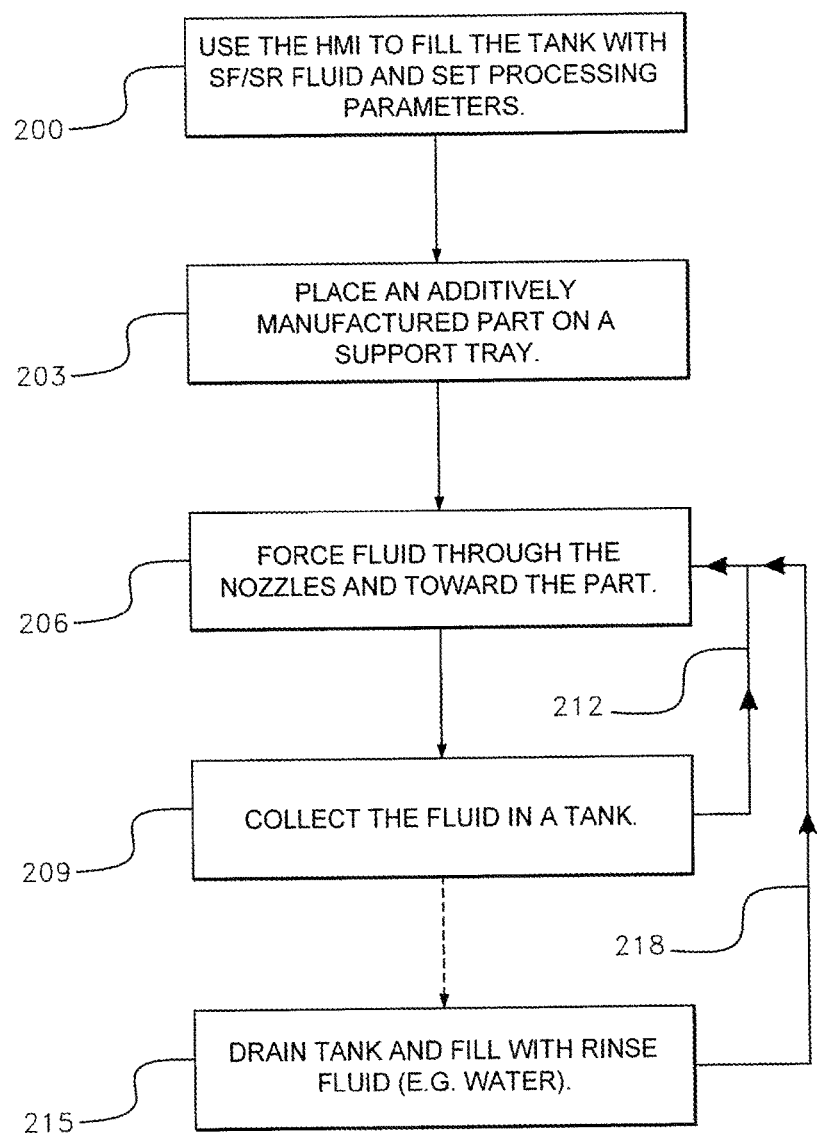
FIG. 6 is a flow diagram depicting a method that is in keeping with the invention.

Operation. A method according to the present invention, illustrated in FIG. 6, may comprise the following of steps to remove support material 28 and/or finish a surface of build material 35 of a part 10 and rinse residual material from a part 10 made using additive manufacturing. The operator may use 200 the HMI 38 to cause the tank 31 to fill with fluid 22. The operator also may use the HMI 38 to set other SF/SR processing parameters for the additive manufactured parts 10 to be SF/SR processed, including temperature (of both the support removal and rinsing fluids), pH of the fluid 22, the length of run time (in hours and minutes), agitation level (e.g., ultra-low, low, medium or high agitation), center-point position of the top spray-header(s) of nozzles 25, the range of distance through which the top nozzles 25A oscillate, and the speed of oscillation of the top nozzles 25A. Additionally, the operator may place 203 one or more additive manufactured parts 10 on the tray 13 within the chamber 16. The heater 96 in the tank 31 may operate to heat the fluid 22, which in turn helps to heat the air in the chamber 16. The fluid 22 can be brought to full temperature prior to starting the SF/SR process, or gradually after the SF/SR process begins.

Next, the pump(s) 33 may activate, drawing fluid 22 from the tank 31, through the pump(s) 33, and then forcing 206 the fluid 22 through the manifold (if used) and those of the open valves 59 toward and through the nozzles 25 associated with the open valves 59 in order to spray the fluid 22. The upper nozzles 25A may oscillate when the associated valves 59 are open and allow fluid 22 to flow to the nozzles 25A, and those nozzles 25A may rotate or otherwise move in accordance with the selected settings. The fluid 22 then exits the nozzles 25 as atomized and/or semi-atomized fluid 22 and collides with the part 10, including the support material 28, whereupon the support material 28 begins to dissolve or otherwise separate from the part 10 and/or rough surfaces of build material 35 of the part begin to smooth. The fluid 22 then passes through the openings in the tray 13 and collects 209 in the tank 31 located under the bottom nozzles 25B, whereupon the fluid 22 cycles 206 through the nozzles 25 again as the pump 33 continues to draw fluid 22 from tank 31. This cycling 212 of the fluid 22 continues for the duration of the run time set by the operator or until the operator manually stops the SF/SR process.

During the SF/SR process, the apparatus 8 may measure the fluid level in the tank 31 to ensure enough fluid 22 is contained in the tank 31. If there is not enough fluid 22 in the tank 31 (e.g., due to evaporation) the apparatus 8 may add fluid 22 components, such as the water, solvent and/or anti-foaming agent as appropriate. The apparatus 8 also may measure the pH of the fluid 22 and dose the tank 31 with water and/or solvent as needed to maintain the desired pH level.

After the prescribed amount of time, the spraying stops, the fluid 22 may automatically drain 215 from the tank 31, the tank 31 may automatically fill 215 with clean water, and then the spraying may re-start to rinse the parts 10. The water may be cycled 218 through the system until a prescribed amount of time has elapsed, the rinsing process stops, and the parts 10 may remain in the chamber 16 for drying by the heated air in the chamber 16.

The ventilation system may operate during the SF/SR process to safely exhaust excess vapors and thus prevent them from escaping out of the chamber 16 to areas that could pose a threat to users standing around the apparatus 8 while the SF/SR process is occurring. The ventilation system may be kept running for a time interval (for example, 5 minutes) after an SF/SR process is completed.

The method may be carried out so as to determine the agitation level in concert with optimal temperature in order to maximize the speed and efficiency of SF/SR processing. When the fluid 22 is too cool, the support material 28 may not be removed as efficiently, but when the fluid is too hot, the part can experience damage such as shape degradation, including warpage. Additionally, as will be appreciated by the disclosure herein, the hardware, electronics, software and fluid 22 may work together to provide desired levels of efficacy and efficiency, from delicate support removal to more robust removal with higher throughput.

Settable parameters can be different and/or customized for particular build and support materials 35, 28 out of which the additive manufactured parts 10 are made, the part geometries including the geometries of support structures, and the degree and speed of support material removal desired. Balancing and varying these parameters increases the efficacy and efficiency at which support material 28 can be removed. The apparatus 8 can be pre-programmed at a factory with "recipes" of the parameter settings known to be suitable for various support and build materials 28, 35, part geometries, etc. Thus, by a single activation operation, e.g. pressing one button or a short sequence of buttons, the operator may be able to set all of the parameters for a given SF/SR process. Additionally, the operator can set parameters and save them as a recipe, which the operator can then select in the future rather than re-inputting each of the settings.

The present invention may further include a logic controller 99 to monitor communication between a central processing unit ("CPU") 102 and the HMI 38. In such an embodiment of the invention, a signal may be sent from the HMI 38 to the CPU 102, and vice-versa. The logic controller 99 may monitor this signal to make sure the signal changes during the SF/SR process. If the signal stops, the logic controller 99 may react by either shutting down the apparatus 8, or the HMI 38 will inform the operator to restart the apparatus 8. The HMI 38 and CPU 102 may be connected to the Internet in order to be operated and evaluated remotely. Additionally, this Internet connection could enable the use of a database that contains a plurality of test parameters and additional recipes that may be used to optimize the SF/SR and rinse processes. The database may alternatively be contained on a hard drive that may be associated with the apparatus 8 itself and be uploaded periodically to a remotely located storage device.

The apparatus 8 may collect and store data about settings and about how the apparatus 8 should or does operate, which can be used to service the apparatus 8 and as feedback for improving SF/SR settings for various types of support and build materials 28, 35 and part geometries.

Figure 7:
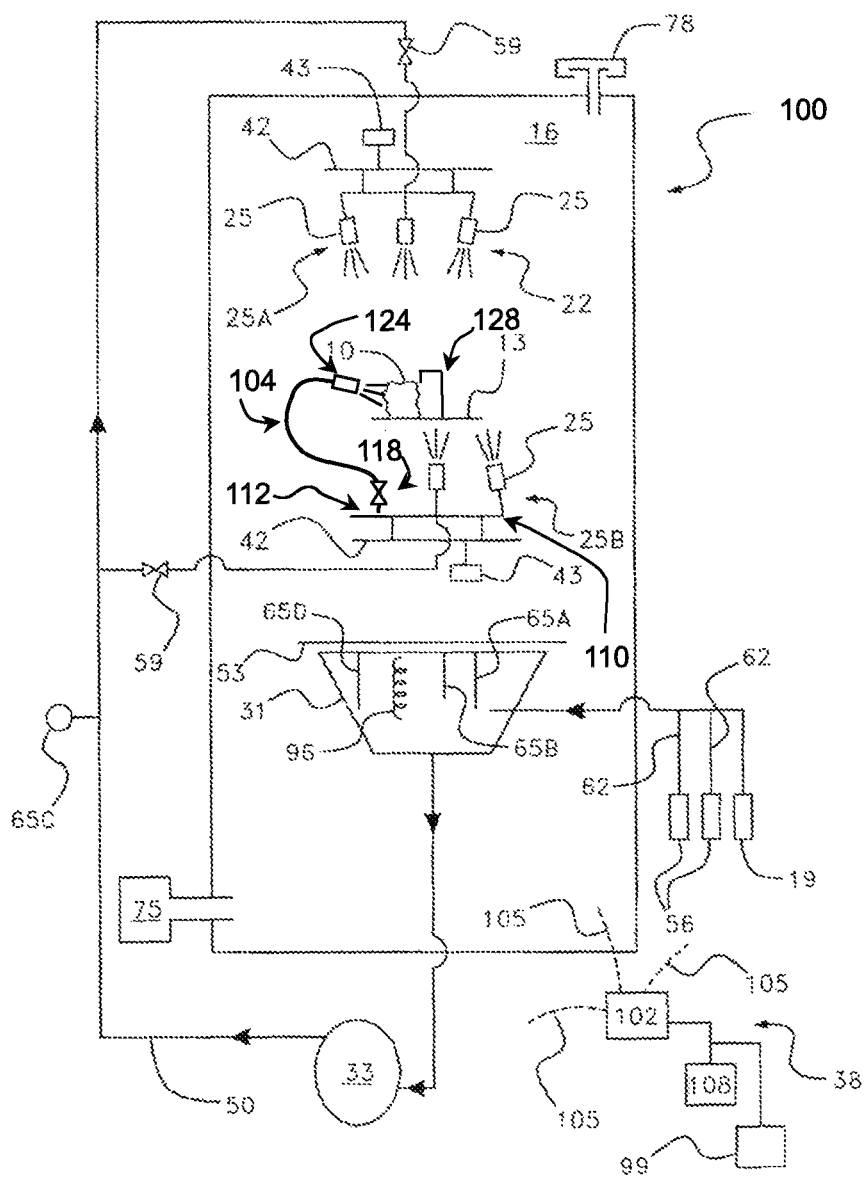
FIG. 7 is a schematic depiction of another embodiment of the apparatus.

FIG. 7 shows another embodiment of an apparatus 100 for surface finishing and support removal of additively manufactured parts. The apparatus 100 is useful for removal of support material from additively manufactured parts that have internal chambers, cavities, or passages. Such internal chambers, cavities, or passages may contain support material produced as part of the additive manufacturing process. It can be difficult to remove support material from internal chambers, cavities, or passages in additively manufactured parts. The apparatus 100 for surface finishing and support removal addresses this need.

The apparatus 100 in FIG. 7 is similar to the embodiment 8 in FIG. 1 and like numerals refer to like components. In the embodiment in FIG. 7, a flexible hose member 104 connects to the lower spray header 110. The lower spray header 110 has a fitting 112 to which the flexible hose member 104 can attach. The fitting 112 can be in addition to the fittings to which the lower nozzles 25B are attached. Alternatively, one of the lower spray nozzles 25B can be removed and the flexible hose member 104 can be connected to the lower spray header 110 in the fitting from which the one lower spray nozzle 25B was removed. The flexible hose member 104 includes a valve 118 operable to shut off flow through the flexible hose member 104. At the end of the flexible hose member 104 is a nozzle 124.

Located on and connected to the platform 13 is an adjustable holding member 128.

Figure 8:
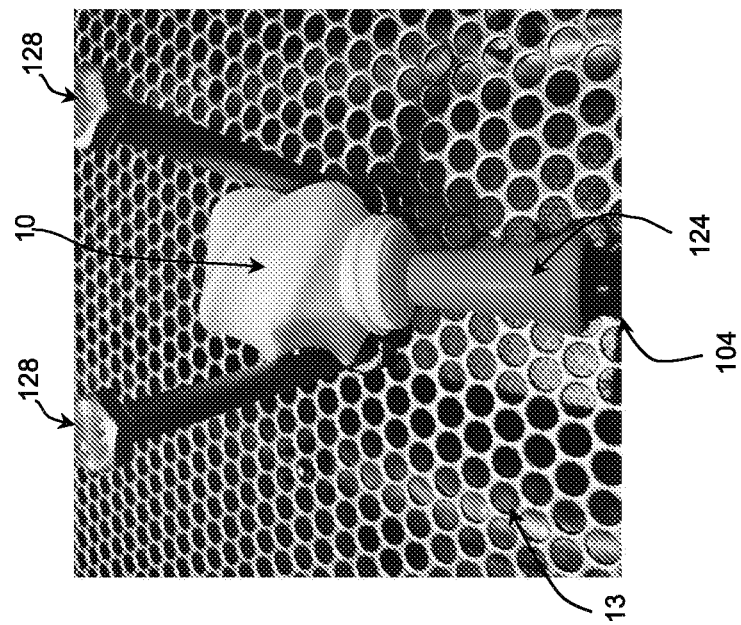
FIG. 8 is a view of a portion of the embodiment shown in FIG. 7.

FIG. 8 shows a view of the interior of the chamber 16. Located on the platform 13 is the part 10. The flexible hose member 104 has been adjusted so that the spray nozzle 124 located at the end of the flexible hose member 104 is directed at the part 10. In this figure, the spray nozzle 124 is adjusted to direct a flow of spray at an interior portion of the part 10. The part 10 is fastened to the platform 13 by the holding member 128. In this embodiment, the holding member 128 is comprised of two bolts that can be fastened to the platform 13 at a desired spacing in order to securely affix the part 10 to the platform 13.

Figure 9:
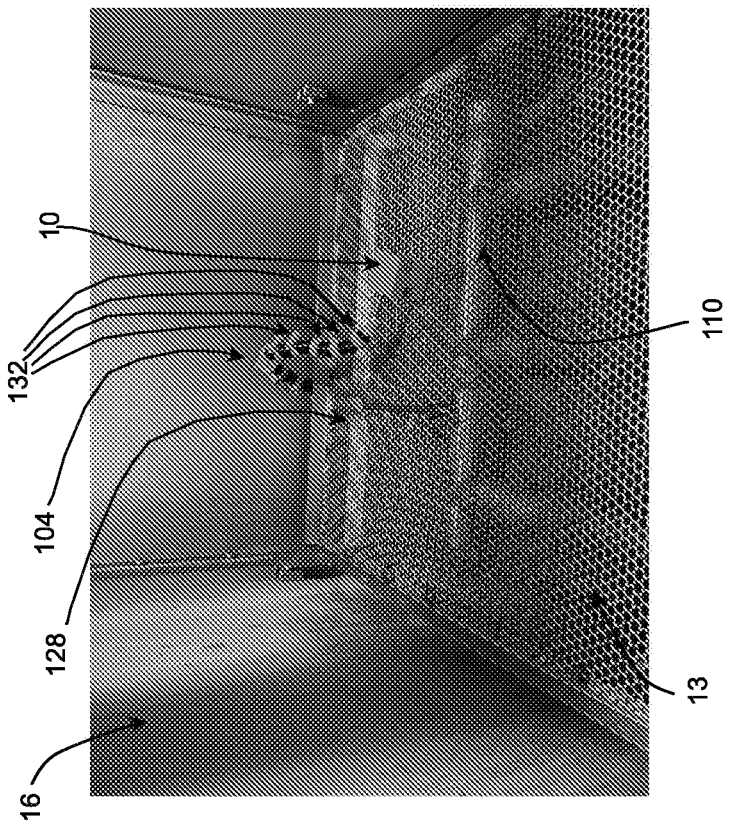
FIG. 9 is another view of a portion of the embodiment shown in FIG. 7.

FIG. 9 is another view of the interior of the chamber 16. As shown in FIG. 9, the part 10 is located on the platform 13 and the flexible hose member 104 has been adjusted so that the spray nozzle 124 located at the end of the flexible hose member 104 is directed at the part 10. In FIG. 9, the part 10 has not yet been fastened to the platform 13 by the holding member 128.

Figure 10:
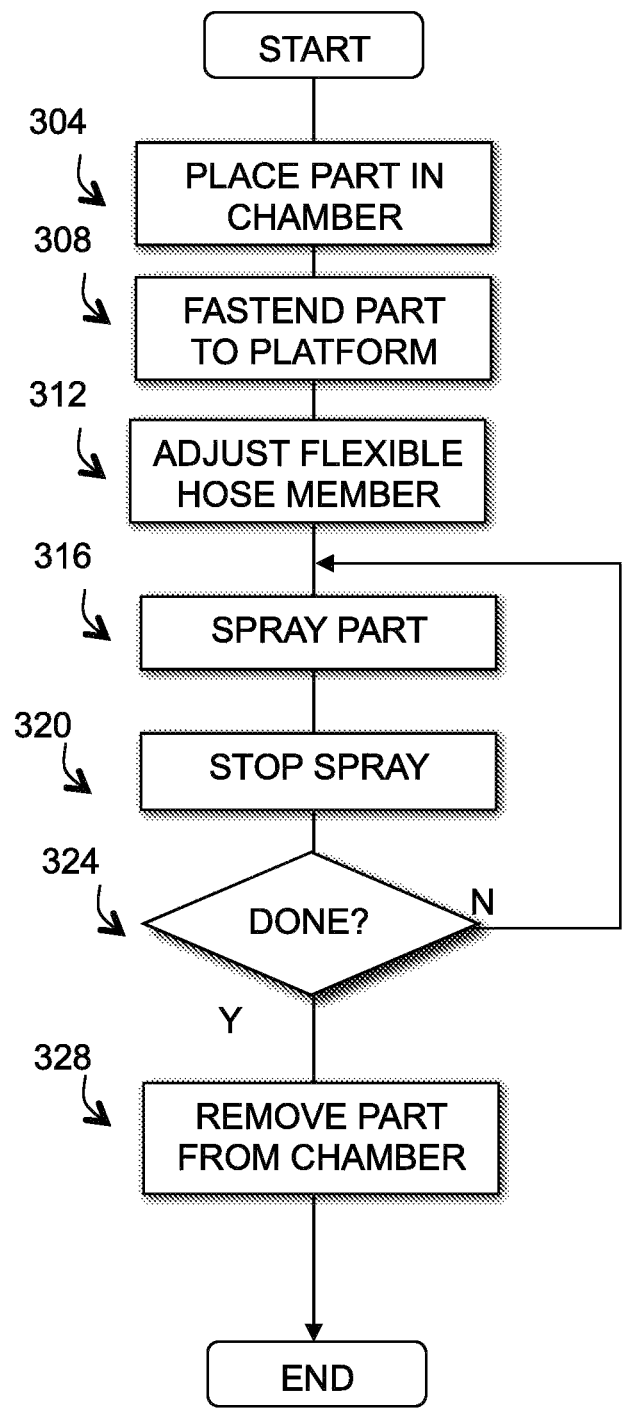
FIG. 10 is a flow diagram depicting a method of operation of the embodiment shown in FIG. 7.

FIG. 10 is a flowchart 300 showing operation of the embodiment of FIG. 7. A part 10 produced by an additive manufacturing process is placed in the chamber 16 (Step 304). The part 10 at this stage is surrounded by support material. The support material is produced with the part 10 as part of the additive manufacturing of the part 10, but is unwanted and needs to be removed before the part 10 can be used for its intended purpose. The part 10 is secured to the platform 13 by the holding member 128 (Step 308). The flexible hose member 104 is adjusted so that its spray nozzle 124 is aimed at the part 10 (Step 312). If the part 10 has an interior portion, the flexible hose member 101 may be adjusted so that its spray nozzle 124 is aimed directly at the interior portion of the part 10. The spray nozzle 124 may be inserted inside the part 10 or may be positioned in close proximity to the part 10, such as less than approximately 5 inches. After the spray nozzle 124 of the flexible hose member 104 is adjusted to spray at the part 10, the apparatus 100 is operated as described in connection with FIG. 1. The chamber 16 is closed and the part 10 is sprayed to remove the support material therefrom (Step 316). The apparatus 100 sprays the part 10 with the top nozzles 25A and the bottom nozzles 25B, as well as the nozzle 124 at the end of the flexible hose member 104. In one embodiment, PG1C or PG2C detergents, available from PostProcess Technologies, Inc., may be used in the apparatus 100 to spray at the part 10. Suitable compositions for these detergents are disclosed in PCT applications Ser. No. PCT/US19/39338, filed Jun. 16, 2019 and PCT/US19/51094, filed Sep. 13, 2019, the entire disclosures of which are incorporated by reference herein. After spraying for a period of time, the part 10 may be inspected to determine whether the support material has been removed (Steps 320 and 324). It can be determined that the support material is removed by visual inspection. The visual inspection may be performed by a human operator or may be performed by programming using object recognition software. Alternatively, the spray can be stopped after a predetermined period of time. After the support material is removed from the part 10, the part is removed from the chamber 16 (Step 328).

In the embodiment of the apparatus 100 in FIGS. 7-9, a suitable product for use as the flexible hose member is a Loc-Line hose available from Lockwood Products, Inc. The Loc-Line hose is available in various diameters and nozzle types. The length is adjustable. In one embodiment, the flexible hose member is approximately 5 feet in length and has a diameter of ¼ inches. A suitable nozzle is a Loc-Line nozzle, stainless, adjustable with dimensions 0.160 by 1.25 inches. A suitable valve is a Loc-Line ball valve. As shown in FIG. 9, the flexible hose member 104 may be used with clamps 132. The clamps 132 increase the rigidity of the flexible hose member 104 so that the nozzle 124 remains directed at the part 10. In one embodiment, the clamps 132 are positioned on every other connection point along the length of the flexible hose member 104. Alternatively, clamps 132 may be positioned every third connection point, or at various other locations along the length of the flexible hose member.

In the embodiment 100 disclosed in FIG. 7, the flexible hose member 104 and holding member 128 are provided as removable parts that can be installed in the apparatus 100 by an operator when needed. In an alternative embodiment, the flexible hose member 104 and holding member 128 may be provided as non-removable parts that are permanently installed in the apparatus 100.

In further alternative embodiments, the flexible hose can be adapted for use in a support material removal system like the one disclosed in U.S. Published patent application 20170348910, filed Jun. 1, 2017, the entire disclosure of which is incorporated by reference herein.

Figure 11:
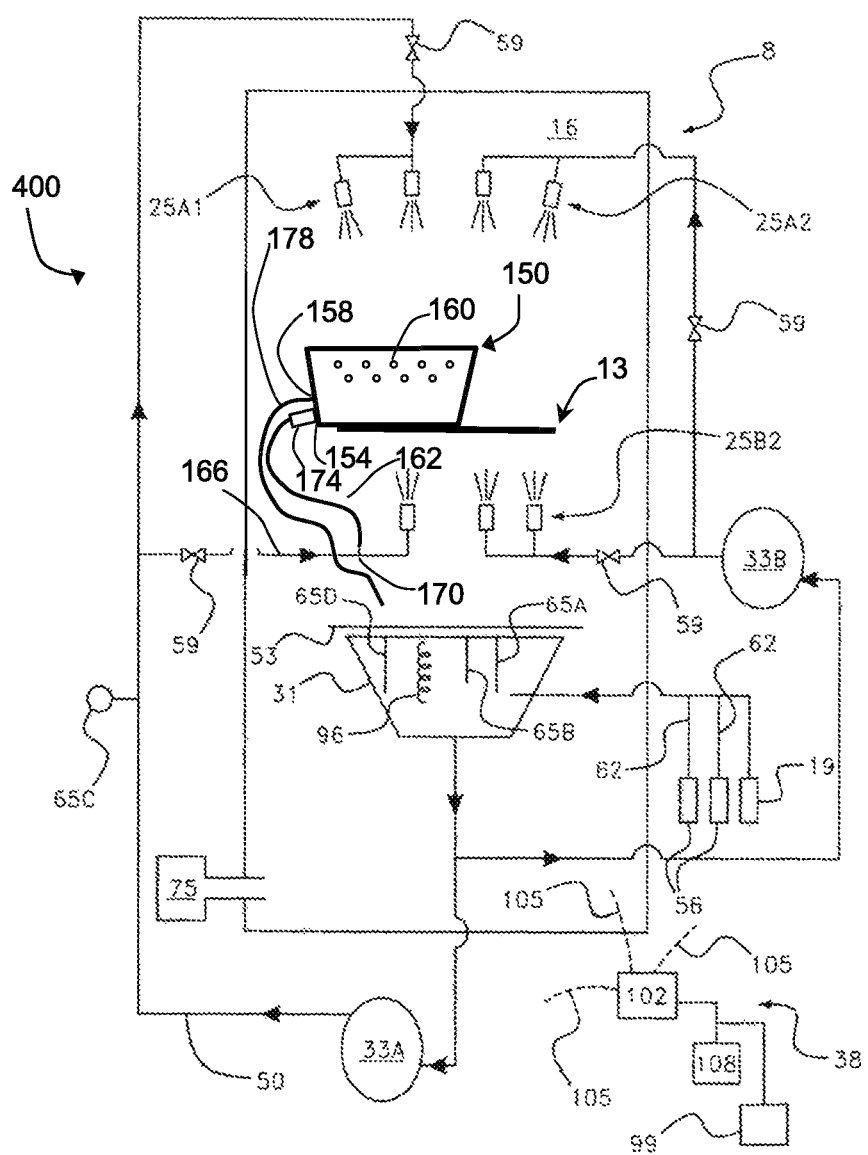
FIG. 11 is a schematic depiction of yet another embodiment of the apparatus.
Figure 12:
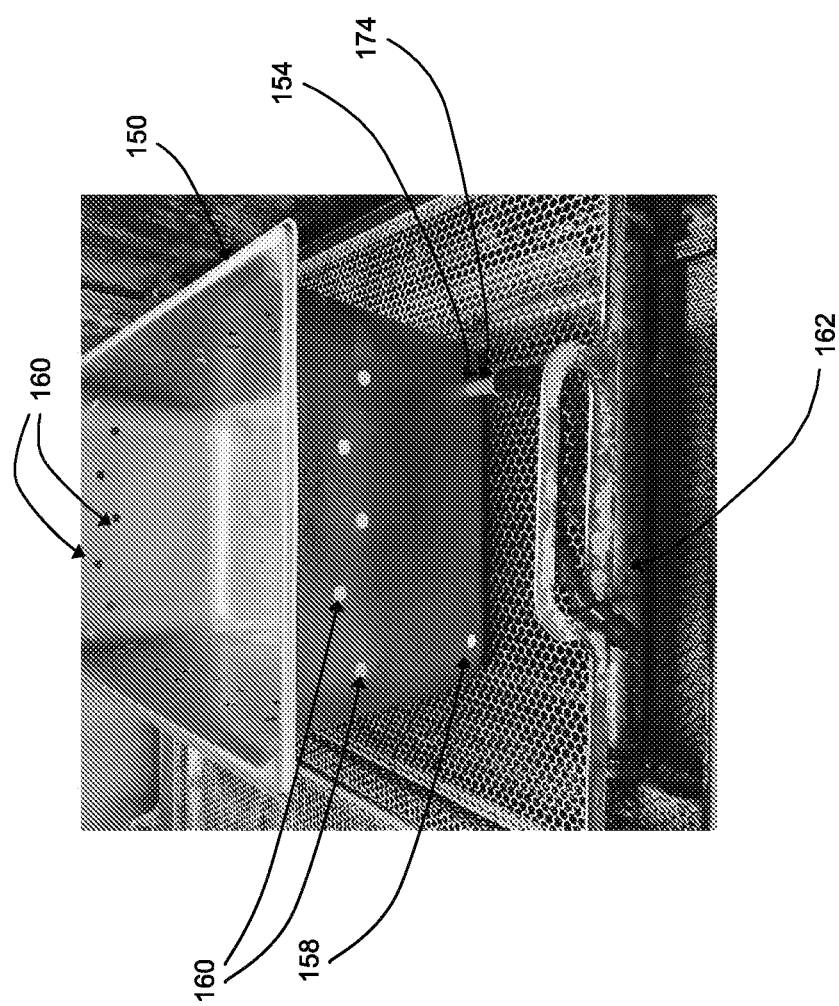
FIG. 12 is a perspective view of the submersion tank shown in FIG. 11.
Figure 13:
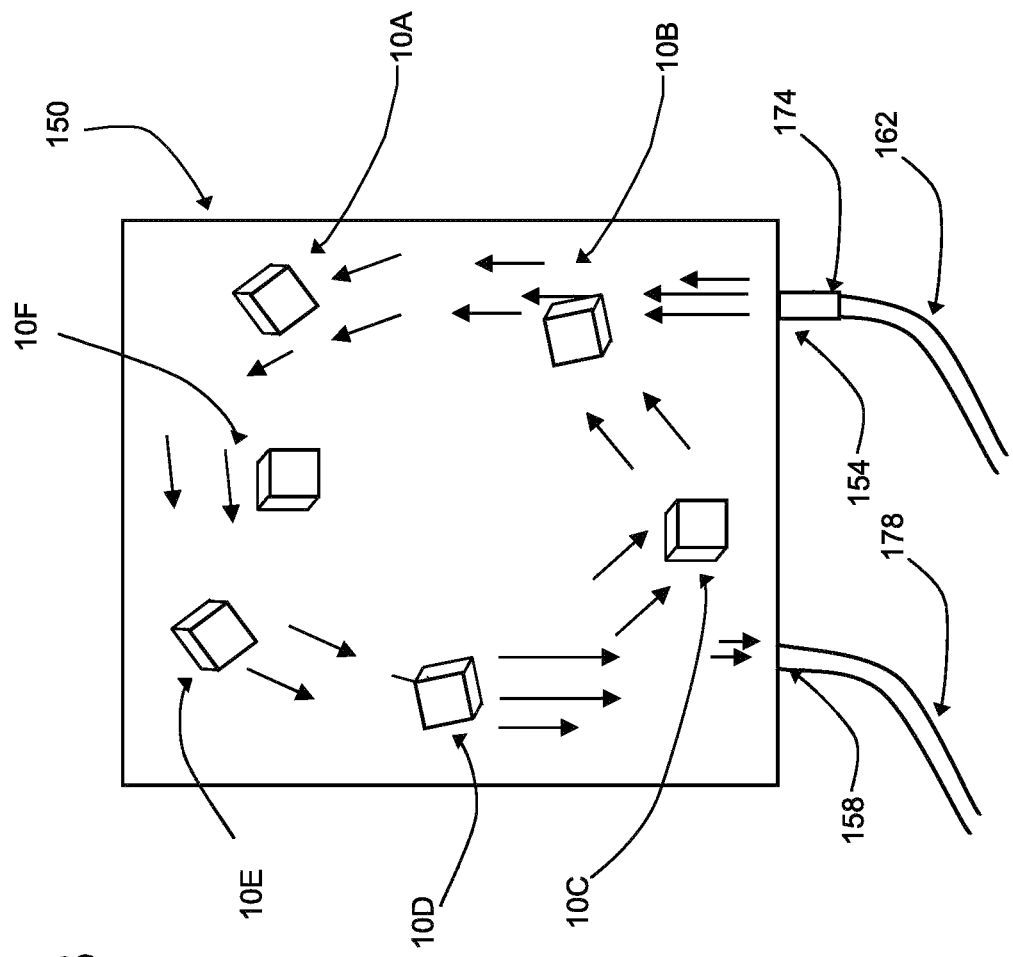
FIG. 13 is a top view of the submersion tank shown in FIG. 11.

FIG. 11-13 show yet another embodiment of an apparatus 400 for surface finishing of and support removal from additively manufactured parts. Like the embodiment 100 in FIGS. 7-9, the apparatus 400 in FIGS. 11-13 is useful for removal of support material from additively manufactured parts that have internal chambers, cavities, or passages. The apparatus 400 in FIGS. 11-13 is especially useful for removing support material from multiple parts at the same time.

The apparatus 400 in FIGS. 11-13 is similar to the embodiment 8 in FIG. 5 and like numerals refer to like components. In the embodiment of FIGS. 11-13, a submersion tank 150 is located on the platform 13. The submersion tank 150 is generally rectangular with an open top. In one embodiment, the submersion tank 150 has approximately the same width and length as the platform 13, but in alternative embodiments, the submersion tank 150 is smaller or larger. The submersion tank 150 is made of stainless steel or other suitable non-reactive material. The submersion tank 150 has approximately a 5 gallon capacity.

As shown in FIG. 12, the submersion tank 150 includes an input port 154 and a drain port 158. The input port 154 is located at one corner of the submersion tank 150 and the drain port 158 is located at an adjacent corner of the submersion tank 150. In addition to the drain port 158, the submersion tank 150 includes a plurality of drainage openings 160 located through its side walls along the upper edges thereof.

again to FIG. 11, an input hose 162 is connected at one end to a fitting 170 on a lower spray header 166. The fitting 170 can be in addition to the fittings to which the lower nozzles 25B2 are attached. Alternatively, one of the lower spray nozzles 25B2 can be removed and the input hose 162 can be connected to the lower spray header 116 in the fitting from which the one lower spray nozzle was removed. The other end of the input hose 162 includes a nozzle 174. The nozzle 174 is attached to the input port 154 thereby connecting the input hose 162 to the submersion tank 150. A drainage hose 178 is connected at one end to the drain port 158. The other end of the drainage hose 178 empties into the tank 31.

Figure 14:
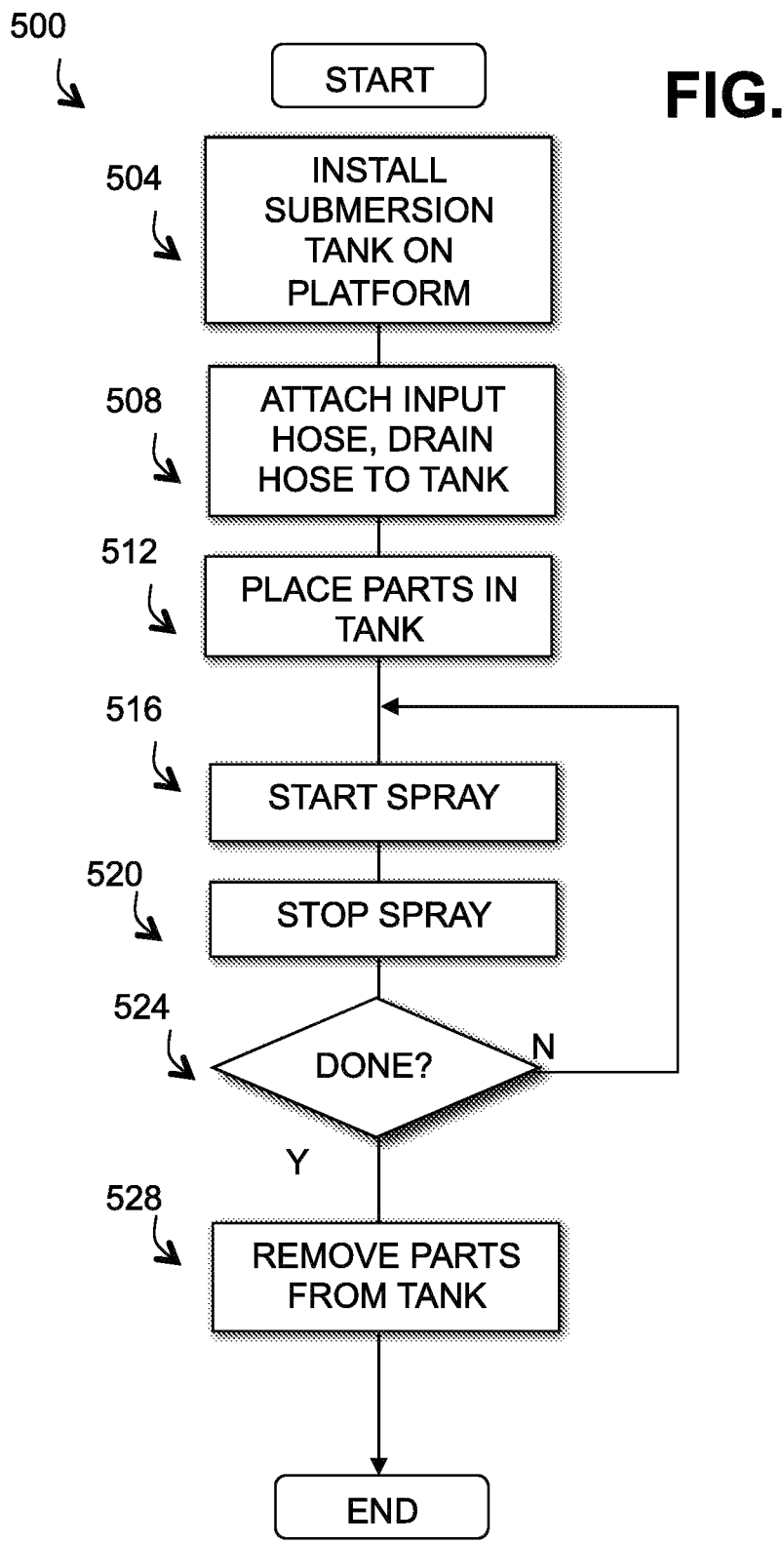
FIG. 14 is a flow diagram depicting a method of operation of the embodiment shown in FIG. 11.

FIG. 14 is a flowchart 500 showing operation of the embodiment of FIGS. 10-13. This embodiment is useful for support material removal from parts made by additive manufacturing processes. With this embodiment, multiple parts can be handled at the same time. In a first step, the submersion tank 150 is installed in the chamber 16 by placing it on the platform 13 (Step 504). Next, the input hose 162 is connected between the lower spray header 166 and the input port 154 of the submersion tank 150 and the drainage hose 178 is connected between the drain port 158 of the submersion tank 150 and the tank 31 (Step 508). (Steps 504 and 508 are performed when adapting the apparatus 400 for use with the submersion tank 150 and may be omitted if the apparatus 400 already has been adapted for use with the submersion tank 150.)

Multiple parts 10A-10F (shown in FIG. 13) produced by an additive manufacturing process are placed in the submersion tank 150 (Step 512). The parts 10A-10F at this stage are surrounded by support material and include support material in inside chambers thereof. The apparatus 400 is operated as described in connection with FIG. 1. The chamber 16 is closed and the parts 10A-10F are sprayed to remove the support material therefrom (Step 516). The apparatus 400 sprays the parts 10A-10F with detergent from the top nozzles 25A1. he input hose 162 attached to the submersion tank 150 fills the submersion tank 150 with detergent. The detergent used to fill the submersion tank 150 is the same detergent sprayed at the parts from the top nozzles 25A1, 25A2 and bottom nozzles 25B2. As the spray is applied, the submersion tank 150 is filled with detergent up to the level of the drainage openings 160. Detergent flows from the submersion tank 150 through the drainage openings 160 into the lower tank 31. As disclosed in the previous embodiment, the detergent used in this embodiment is PG1C or PG2C detergents, available from PostProcess Technologies, Inc.

When the detergent in the submersion tank 150 rises to the level of the drainage openings 160, detergent also flows from the submersion tank out the drain port 158, through the drainage hose 178, and into the tank 31. As shown in FIG. 13 (by the arrows), the spray of detergent from the nozzle 174 on the input hose 162 into the submersion tank 150 combined with the drainage of detergent out of the submersion tank 150 from the drain port 158 causes a circular flow of detergent in the submersion tank 150. In addition, the spray of detergent from the upper nozzles 25A1 onto the surface of the detergent in the submersion tank 150 (as shown in FIG. 11) pushes the parts 10A-10F below the surface of the detergent in the submersion tank 150. The combination of the circular flow in the submersion tank 150 and the application of spray from the upper nozzles 25A1 causes the parts 10A-10F to tumble in the flow of detergent and to remain under the surface of the detergent in the submersion tank 150. This action causes support material located in inside chamber of the parts 10A-10F to be removed efficiently and effectively.

After application of the spray for a period of time, the parts 10A-10F may be inspected to determine whether the support material has been removed (Steps 520 and 524). It can be determined that the support material is removed by visual inspection. The visual inspection may be performed by a human operator or may be performed by programming using object recognition software. Alternatively, the spray can be stopped at a predetermined period of time. After the support material is removed from the parts 10A-10F, the parts are removed (Step 528).

In the embodiment 400 disclosed in FIG. 11, the submersion tank 150, the input hose 162, and the drainage hose 178 are provided as removable parts that can be installed in the apparatus 400 by an operator when needed. In an alternative embodiment, the submersion tank 150, the input hose 162, and the drainage hose 178 may be provided as non-removable parts that are permanently installed in the apparatus 400.

In the foregoing description, example embodiments are described. The specification and drawings are accordingly to be regarded in an illustrative rather than a restrictive sense.

It will be appreciated that various aspects of the above-disclosed invention and other features and functions, or alternatives thereof, may be desirably combined into many other different systems or applications. Various presently unforeseen or unanticipated alternatives, modifications, variations, and/or improvements therein may be subsequently made by those skilled in the art, and those alternatives, modifications, variations, and/or improvements are intended to be encompassed by the following claims.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

The invention claimed is:

1. An apparatus for removing support material from and/or smoothing surfaces of an additively manufactured part, comprising:
   a chamber;
   a submersion tank located in the chamber and sized and adapted for containing the additively manufactured part, wherein the submersion tank has an inlet;
   at least one nozzle located in the chamber above the submersion tank, the at least one nozzle configured for spraying from above the submersion tank a fluid toward the submersion tank so that in use the fluid is directed at said additively manufactured part in the submersion tank;

a pump connected to the at least one nozzle located above the submersion tank and adapted to provide the fluid thereto under pressure so that the fluid prior to being sprayed from the at least one nozzle located above the submersion tank is pressurized;

another nozzle located in the chamber and connected to the submersion tank to fill the submersion tank with the fluid and to cause a circular flow of fluid therein; and a central processing unit connected to the pump and adapted to adjust the pressure at which the pump provides the fluid to the at least one nozzle located above the submersion tank so that the spraying of the fluid pushes the additively manufactured part below a surface of the fluid in the submersion tank.

2. The apparatus of claim 1 wherein the submersion tank also includes a drain located on a corner of the submersion tank adjacent to the inlet.

3. The apparatus of claim 1 wherein the submersion tank is sized and adapted for containing a plurality of additively manufactured parts.

* * * * *